(12) United States Patent
Jerrard-Dunne

(10) Patent No.: US 7,500,008 B1
(45) Date of Patent: Mar. 3, 2009

(54) VIDEO STREAM RECORDING PREVENTION

(75) Inventor: Stanley Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/015,628

(22) Filed: Jan. 17, 2008

(51) Int. Cl.
G06F 15/16 (2006.01)
G06F 12/00 (2006.01)

(52) U.S. Cl. .................. 709/231; 709/217; 709/218

(58) Field of Classification Search ............... 709/217, 709/218, 231, 232, 219
See application file for complete search history.

(56) References Cited

U.S. PATENT DOCUMENTS

| | | | |
|---|---|---|---|
| 4,821,097 A | 4/1989 | Robbins | |
| 5,146,495 A | 9/1992 | Son | |
| 5,615,401 A * | 3/1997 | Harscoet et al. | 719/322 |
| 7,017,173 B1 * | 3/2006 | Armstrong et al. | 725/87 |
| 7,174,085 B2 * | 2/2007 | Demas et al. | 386/68 |
| 2003/0135613 A1 * | 7/2003 | Yoshida et al. | 709/224 |
| 2005/0033850 A1 | 2/2005 | Kirkland | |
| 2005/0071437 A1 * | 3/2005 | Bear et al. | 709/212 |
| 2005/0226170 A1 | 10/2005 | Relan et al. | |
| 2006/0136718 A1 | 6/2006 | Moreillon | |

FOREIGN PATENT DOCUMENTS

WO  WO2006006081 A2  1/2006

* cited by examiner

*Primary Examiner*—Zarni Maung
(74) *Attorney, Agent, or Firm*—MaxValueIP, LLC

(57) ABSTRACT

A system to prevent unauthorized recording of video streams has been presented. Both parties to the transmission of video data usually have the permission to ask for or offer video streams. However, after real-time video sharing session is initiated between two parties and the video streaming connection is established, the sender has no control over how the transmitted data will be further used by the receiver. For example, the video stream can be easily recorded by a video recorder. In the context of webcams, a system that searches for and identifies the possible recording device on the destination machine and notifies the sender of the finding can greatly improve the privacy precautions in such video sessions. At configured time intervals, say every minute, the client re-checks for running processes that are known webcam recorders, and if one is detected, it gives the other party the option to take the desired measures.

1 Claim, 3 Drawing Sheets

VIDEO STREAM RECORDING PREVENTION

BACKGROUND OF THE INVENTION

Today, audio and video data streaming from remote locations are quite common practices. Cable TV companies have commercialized various forms of on-demand video or audio streaming. Also, on-demand video broadcasting systems usually offer to save a desired program for later use by the client. However, directly storing some of such material by the client and on the client's device may be illegal due to specific copyright laws. Without a proper security alarming system, the streamed data can be easily recorded by a video recorder. In case of any security breach by for example a cyber intruder, the risk can be the digital storage of this stream of data as it arrives in the destination using a form of digital video recorder without consent or knowledge of the user.

Systems have been proposed by which a media file or broadcast can be transferred to another device operating within the same network. The transfer in form of downloads and uploads can be done remotely. But the fate of a real-time video stream will remain unclear. Encryption and scrambling methods have been used to restrict their further usage. But the sender will never be informed of fate of the transmitted signals and will never have control over them.

Webcams have become very popular and are now regularly used to share video across instant message clients. Webcam recording software is also available that allows recording of the video stream, both on the sender and receiver side. Numerous methods of security precautions have been reported to ensure the security and privacy of the media en route to the destination. But in case of a direct video streaming session, there is currently no way for a user to know if the person on the other side of the connection is recording the stream, and no way to prevent this recording. This leads to a potential violation of privacy. This invention if applied to the popular messaging clients can go a long way to help prevent violations, keeping in mind that total protection is not possible, because for instance, someone could point a regular video camera at their computer screen to record images.

SUMMARY OF THE INVENTION

A system to prevent unauthorized recording of video streams has been presented. A real-time video sharing session is usually initiated when a party offers or requests its own or the other party's video stream. The other party has the option to either accept or reject the request. Both parties usually have the permission to ask for or offer video streams, and both are in agreement about such session once the decision is made by the second party. This way, the session has been approved to start by both parties but the nature of the media, in which the video stream is consumed, has not been agreed upon and can be of any forms including, for example, a video recorder. In the context of webcams, a system that searches for and identifies the possible recording device on the destination machine and notifies the sender of the finding can greatly improve the privacy precautions in such video sessions. On initiation of a camera sharing session, the client software on both the sender and receiver sides check for running processes that are known webcam recorders. If one is detected a message is sent to the other party indicating that recording is active and giving them the option to not proceed with the video session. At configured time intervals, say every minute, the client rechecks for running processes that are known webcam recorders, and if one is detected, it gives the other party the option to take the appropriate measures.

DETAILED DESCRIPTION OF THE PREFERRED EMBODIMENTS

A real-time video sharing session is usually initiated when a party offers or requests its own or the other party's video stream. The other party has the option to either accept or reject the request. Both parties usually have the permission to ask for or offer video streams, and both are in agreement about such session once the decision is made by the second party. This way, the session has been approved to start by both parties but the nature of the media, in which the video stream is consumed, has not been agreed upon and can be of any forms including, for example, a video recorder. The suspicion that the video streams might be recorded is a discouraging factor towards using webcam devices. Various phone-tapping regulations as adopted by different states partly alleviated the inconvenience when talking over the phone, fearing that such conversations might be recorded.

In the context of webcams, a system that searches for and identifies the possible recording device on the destination machine and notifies the sender of the finding can greatly contribute to improving the privacy precautions in such video sessions.

For this to work effectively, it requires that popular IM clients, such as for example "Microsoft Messenger", "Lotus Sametime", Skype, Yahoo! and so forth, implement a standard mechanism to inform users of recording software detected running on both machines. On initiation of a camera sharing session, the client software on both the sender and receiver sides check for running processes that are known webcam recorders. If one is detected a message is sent to the other party indicating that recording is active and giving them the option not to proceed with the video session. At configured time intervals (e.g. every minute), the client rechecks for running processes that are known webcam recorders, and if one is detected gives the other party the option to cancel the session.

Known webcam or screen recorders would be catalogued in a central site, and the client software periodically updated to have the complete up-to-date list, similar to how virus detection software are kept current.

Figure 1:
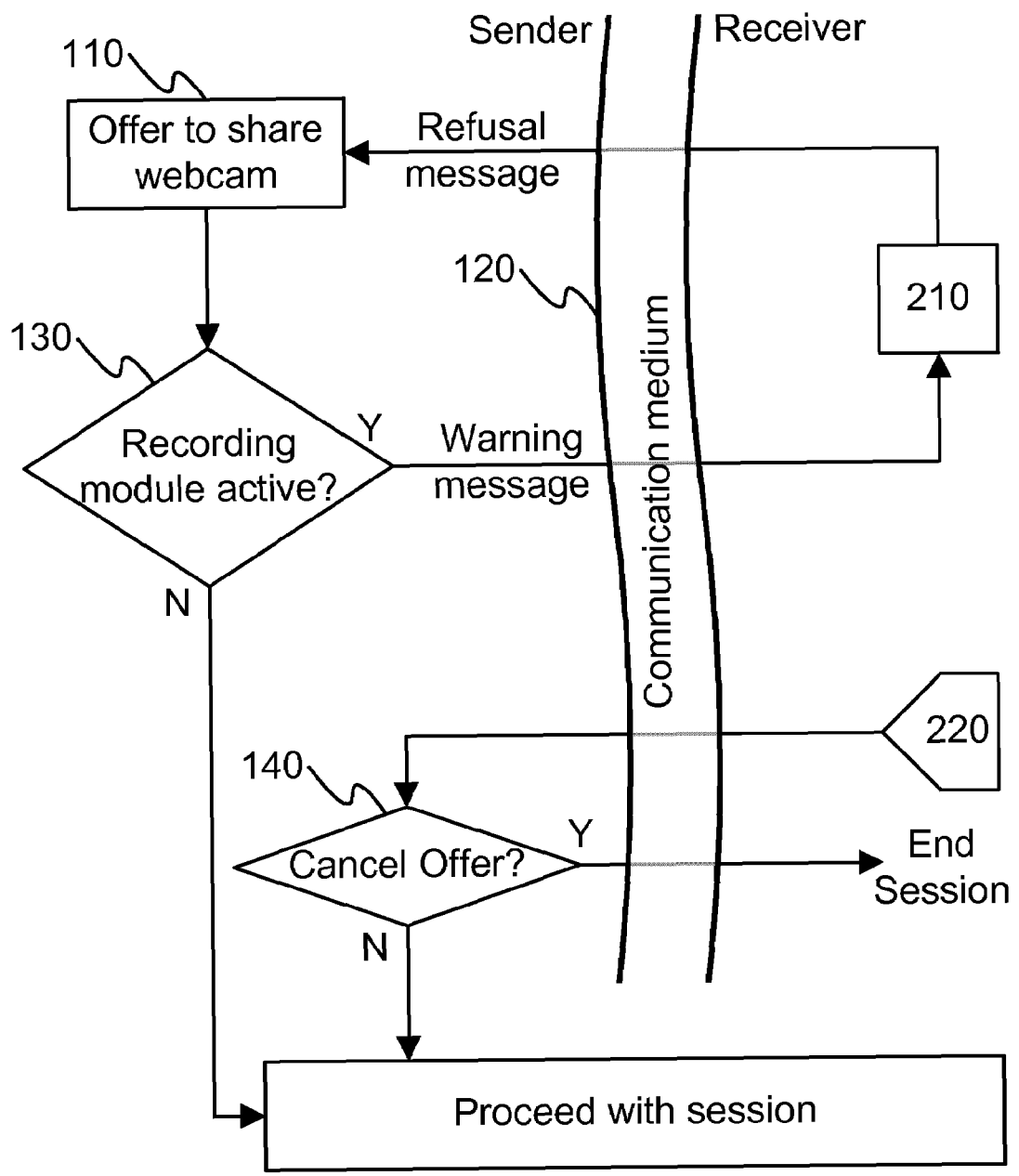
FIG. 1 describes the initiation of the video streaming process from the sender's point of view.
Figure 2:
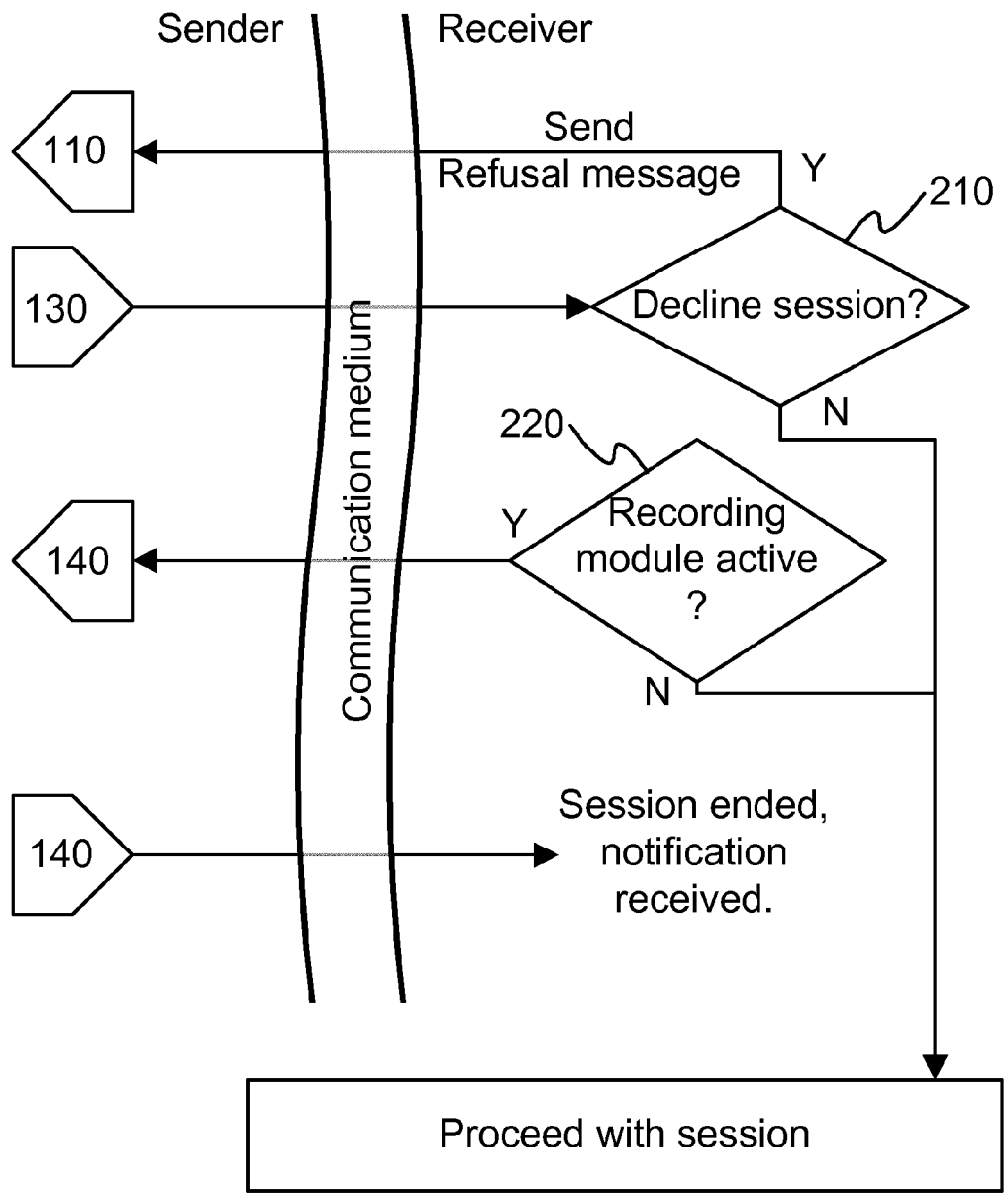
FIG. 2 depicts the initiation of the video streaming process from the receiver's point of view.
Figure 3:
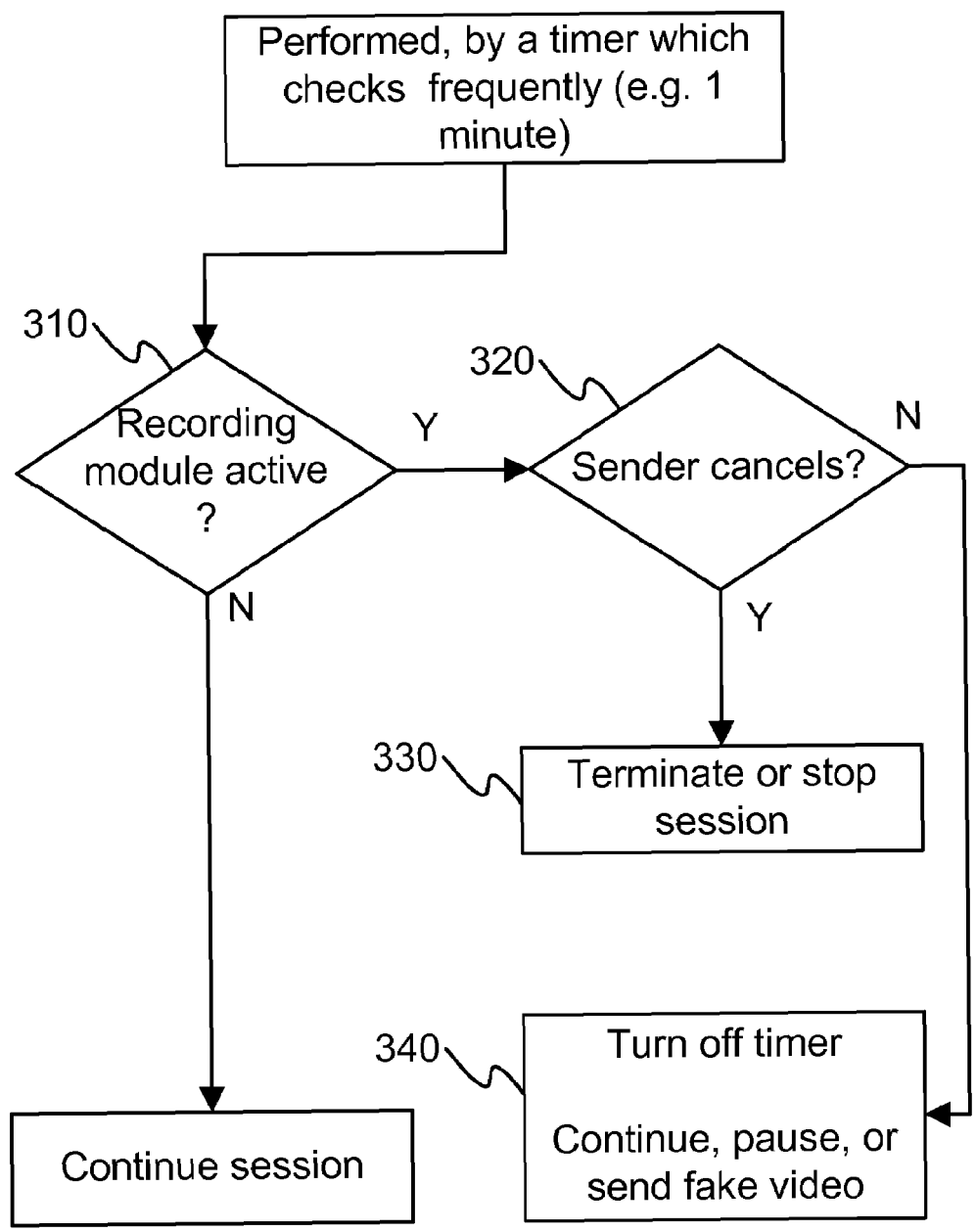
FIG. 3 is the process flow diagram when the session is in ON position and explains the continuation of the session. The warning module checks continuously the existence of the recording module on the receiver's machine and sends the proper notification to the sender when the recording device is caught recording.

FIG. 1 and FIG. 2 describe the process of initiating a video streaming session. The potential sender sends a message to the potential receiver (110) to offer a video session. The pieces of client software on both the sender (130) and receiver (220) check for running processes that are known webcam recorders. If one is detected, a message is sent to the other party indicating that recording is active and giving it the option not to proceed with the video session (140, 210). FIG. 3 addresses the process of detecting a recording device after a session has started. At configured time intervals after the session has been initialized (for instance every minute), the client re-checks (310) for running processes which are known webcam recorders, and if one is detected, it issues a notification and gives the other party the option to cancel the session (320).

In one embodiment, the subject of present application is a system for preventing the recordation of live broadcast of personal or copyrighted video. The system includes a communication medium such as internet or IM software (e.g. Yahoo! or Skype), the sender and the receiver. A recording device is connected to the receiver. For the purpose of issuing warnings when an active recorder is detected, a warning module should be included as well. The sender sends the receiver a video stream through the webcam software provided by the IM software and through internet, local network, cable or wireless network. The incoming video stream is recorded by the recorder at the receiver side. At this point, a database is needed to identify the recording software and/or hardware installed or connected to the receiver side which should also be powered "ON." If the active recording device or software can be located in the database of recording software, a warning containing proper notification is sent to the sender.

In one embodiment, if a running recording device or process is found at the initialization, the sender has the option to withdraw offer. In case the recording means was not active during initialization and a session was started, the warning software or system repeatedly searches such recorders and checks their status for the duration of the video streaming. This search can be conducted in equal time intervals or just randomly. Likewise, a warning is sent to the sender if such active devices are found within the receiver apparatus and the sender has the option to stop the video stream.

It is possible that the sender can be given more options in acting upon such notifications from the warning module. The sender can continue or pause (340), stop or cancel altogether (330) the transmission, or even send a fake video stream instead (340). The system may then notify the receiver about the decision made by the sender. Obviously, there is no need for notification when the decision is either "to continue" or "to send a fake video stream."

For example in one embodiment, for preventing the recordation of video stream, the system comprises a communication medium between a first entity and a second entity, a warning module, and a recording module. The first entity sends a video stream to the second entity through the communication medium. The recording module captures and records the transmission of the video stream, if the recording module is active.

A repository holds information about the identification of recording devices and software. The warning module comprises a database holding information about the identification of recording devices and software. The warning module updates the database, on a regular time interval, making use of the repository;

If said warning module is active, then it checks the status of the recording module. The warning module checks the status of the recording module either based on a periodic interval or based on a randomly-generated period of time. If the recording module and the warning module are both active, then the warning module notifies the first entity that the recording module is active.

Based on the warning module's notifying the first entity, the first entity performs only one of the following actions: continue, pause, stop, or cancel the transmission of the video stream, or send a fake video stream.

In the case of the only one of the following options being performed as pause, stop, or cancellation of the transmission of the video stream, the first entity notifies the second entity about the only one of the following options being performed.

This is similar to the operation of anti-spyware (process recognition) and antivirus software (maintenance of a central up-to-date library of webcam recorders which the client then downloads regularly).

The inventor envisages that this solution would be most valuable in a consumer environment as a feature of consumer IM clients like Yahoo!, Windows Live Messenger, AIM, etc. In addition, there would be value in protection of inter-company IM interactions by similar methods.

The described system can be altered to be used against phone tapping devices. If a warning module with access to a database of audio recording devices or software, detects such recorders, it can notify the person whose voice is being recorded, and therefore, the person has similar options to continue or stop the conversation.

The recording module can be any device directly connected to the PC such as a VCR connected to the PC or digital recorder software which can be found in most webcam software and uses the hard disk or any other types of memory, tapes, etc. for recording purposes. It can even be imagined that a wireless video stream transmitter sends the video to another apparatus to be recorded. Therefore, such devices should also be registered in the database and be searched for during the video streaming.

Any variations of the above teachings are also intended to be covered by this patent application.

The invention claimed is:

1. A system for preventing the recordation of video stream, said system comprising: a communication medium between a first entity and a second entity; a warning module to ensure security and privacy; and a recording module;

wherein said first entity sends a video stream to said second entity through said communication medium;

wherein said first entity is at sending side, and said second entity is at receiving side;

wherein said recording module, located at said receiving side, captures and records the transmission of said video stream, if said recording module is active;

wherein a repository holds information about the identification of recording devices and software;

wherein said warning module, located at said sending side, comprises a database holding information about the identification of recording devices and software;

wherein said warning module updates said database, on a regular time interval, using said repository;

wherein if said warning module is active, then said warning module checks the status of said recording module either based on a periodic interval or based on a randomly-generated period of time;

wherein if said recording module is active and if said warning module is active, then said warning module notifies said first entity that said recording module is active;

wherein based on said warning module's notifying said first entity, said first entity performs only one of options: to continue said transmission of said video stream, to pause said transmission of said video stream, to stop said transmission of said video stream, to cancel said transmission of said video stream, or to send a fake video stream; and in the case of said pause, stop, or cancellation of said transmission of said video stream, said first entity notifies said second entity about said only one of the following options being performed.

* * * * *